UNITED STATES PATENT OFFICE.

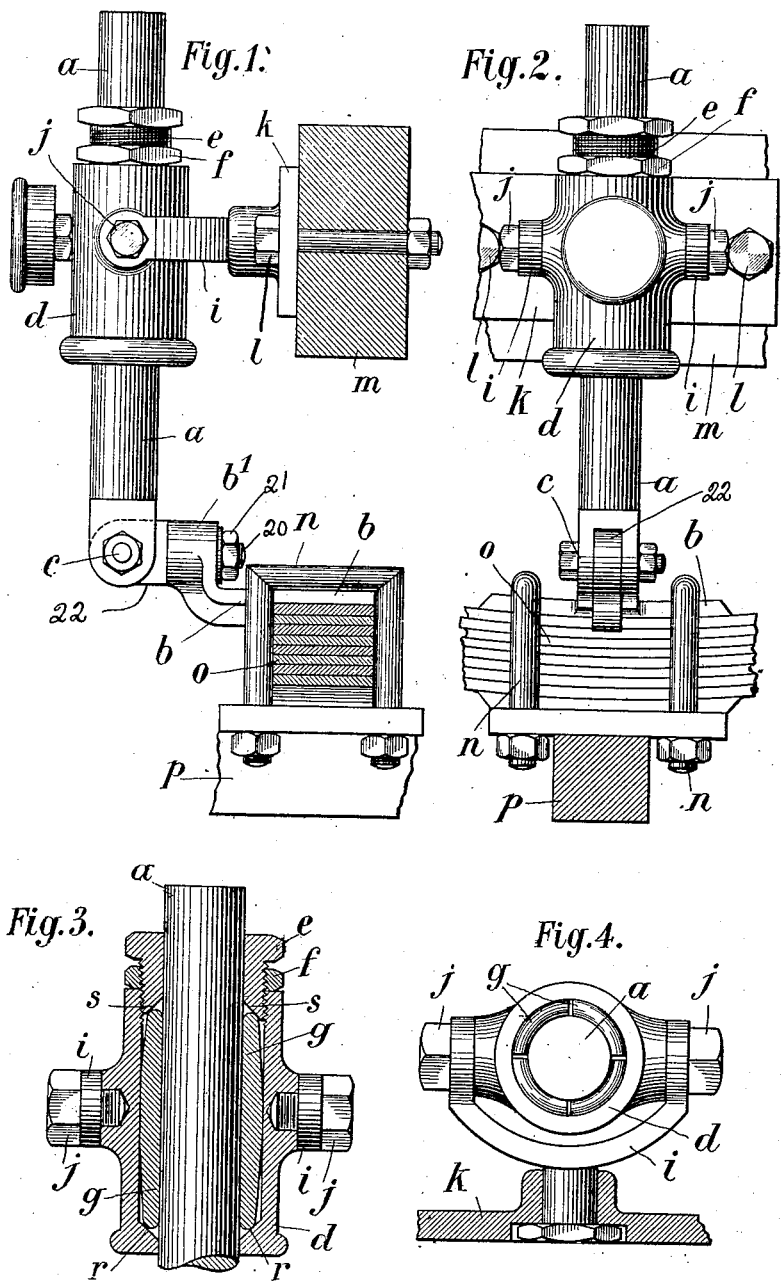

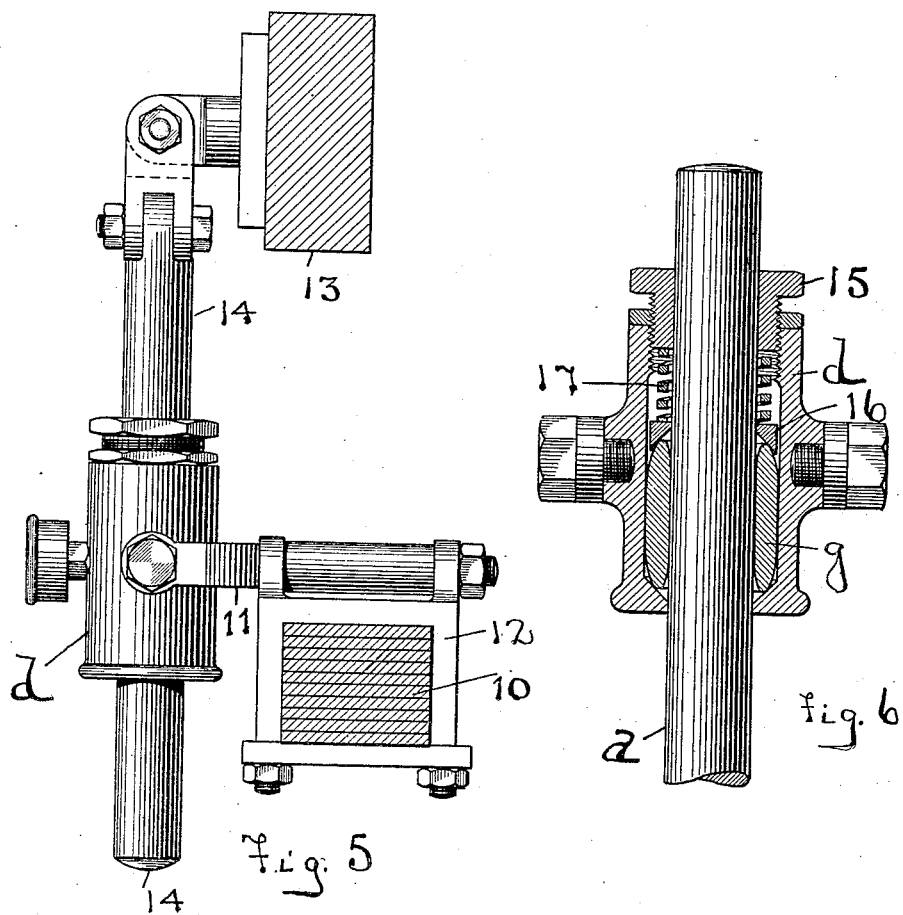

WILLIAM BLANC AND LOUIS PAICHE, OF GENEVA, SWITZERLAND.

VEHICLE SUSPENSION.

No. 829,760.           Specification of Letters Patent.           Patented Aug. 28, 1906.

Application filed April 14, 1905. Serial No. 255,564.

*To all whom it may concern:*

Be it known that we, WILLIAM BLANC and LOUIS PAICHE, mechanicians, of Geneva, Switzerland, have invented certain new and useful Improvements in Vehicle Suspensions, of which the following is a specification.

The invention relates to improvements in and relating to the suspension of automobile-cars. The improved suspension is especially intended to act in connection with other devices as a brake for that part of a vehicle which is suspended by means of suitable springs to the axles of the vehicle, and particularly of an automobile-car.

The accompanying drawings show, by way of example, one form of execution of the invention in connection with a vehicle-suspension device.

Figure 1 shows in elevation the device connecting the frame *m* of a vehicle to the axle *p*. Fig. 2 is a side view of the suspension device seen from left to right of Fig. 1. Fig. 3 is an axial section of the shaft and casing forming a portion of the device shown in Figs. 1 and 2. Fig. 4 is a top view of Fig. 3. Figs. 5 and 6 show modifications hereinafter referred to.

In Figs. 1 and 2, *p* is the axle, and *m* the frame, of an automobile-car or other vehicle. Upon the axle *p* there are fastened, by means of links *n*, the car-springs *o* and the bracket *b*, which is provided with a tubular ear *b'*, through which projects a shank 20, rotatably mounted in the tubular ear or bearing *b'* and secured by the nut 21, which engages its threaded end. The other end of the shank 20 is formed with an ear 22, through which passes a bolt *c*. This said bolt *c* carries a shaft *a*, frictionally adjusted in the casing *d* of the suspension, said casing *d* being connected to the frame *m* by means of pivots *j* and of a forked bracket *i*, which is pivotally connected to the plate *k*, which is fastened to the frame *m* by means of bolts *l*. The casing *d* contains brasses *g*, consisting of several sections, the conical ends of which bear, on the one hand, against a conical bottom *r*, Fig. 3, at one end of the casing and, on the other hand, against the conical inside *s* of a nut *e*, forming the opposite end of casing *d*. *f* is a set-nut which serves to lock the nut *e* after the latter has adjusted the sections *g* of the brasses with the desired friction against the axle *a*. The staff *a* is free to swing not only upon the bolt *c*, but also upon the shank 20, which has a bearing in the tubular ear *b'*. Thus the staff *a* is yieldingly connected to the axle member *p*, since through the construction just described a fore-and-aft movement of the body relative to the axle member *p* is permitted without twisting or wrenching the parts. It is easy to understand that the transmission of the axle vibrations by the springs *o* to the frame *m* of the carriage will be checked by the friction of axle *a* in its bearing, which braking may be controlled at will by tightening more or less the nut *e*.

In Fig. 5 the parts are shown reversed in position—that is, the springs 10 are pivotally connected by the fork 11 and frame 12 to the casing *d*, while the vehicle-body (conventionally represented at 13) is pivotally connected to the upper end of the shaft 14.

In Fig. 6 is shown in sectional view the interior of the casing *d*, a spring 17 in this case being interposed between the nut 15 and the washer 16, which rests upon the brasses *g*.

Having thus fully described our invention, we claim—

1. In a vehicle suspension, in combination with a vehicle-body and an axle, a shaft interposed therebetween and pivotally connected with one of said members; a casing pivotally connected with the other of said members, said shaft extending into said casing; and means for regulating the friction between said casing and shaft.

2. In a vehicle suspension, in combination with a vehicle-body and an axle, a shaft interposed therebetween and connected with one of said members; a casing connected pivotally and yieldingly with the other of said members, said shaft extending into said casing; and means for regulating the friction between said shaft and casing.

3. In a vehicle suspension, in combination with a vehicle-body and an axle, a shaft interposed therebetween and connected with said axle; a bearing for said shaft; and a fork in which said bearing is pivotally mounted; said fork being connected with said vehicle-body.

4. In a vehicle suspension, in combination with a vehicle-body and an axle, a shaft interposed therebetween and connected with said axle; a bearing for said shaft; and a fork in which said bearing is mounted, said fork being pivotally connected with said vehicle-body.

5. In a vehicle suspension, in combination with a vehicle-body and an axle, a friction-regulating device interposed therebetween and pivotally and yieldingly connected to one of said members; and a shaft pivotally connected to the other of said members and fitted to slide lengthwise in said device.

6. In a vehicle suspension, in combination with a vehicle-body and an axle, a friction-regulating device interposed therebetween and pivotally connected to one of said members; and a shaft pivotally connected to the other of said members and fitted to slide lengthwise in said device.

7. In a vehicle suspension, in combination with a vehicle-body and an axle, a shaft interposed therebetween and connected with one of said members; a casing connected with the other of said members, said shaft extending into said casing; and means for regulating the friction between said casing and shaft.

8. In a vehicle suspension, in combination with a vehicle-body and an axle, a shaft interposed therebetween and connected with one of said members; a casing connected pivotally with the other of said members; said shaft extending into said casing; and means for regulating the friction between said shaft and casing.

In testimony whereof we have signed our names to this specification in the presence of two subscribing witnesses.

WILLIAM BLANC.
LOUIS PAICHE.

Witnesses:
  L. H. MUNIER,
  J. IMER.